US012639979B2

(12) United States Patent
Schwartz et al.

(10) Patent No.: US 12,639,979 B2
(45) Date of Patent: May 26, 2026

(54) BIOMETRIC IDENTIFICATION IN A VEHICLE ENVIRONMENT

(71) Applicant: Ford Global Technologies, LLC, Dearborn, MI (US)

(72) Inventors: Jake Schwartz, Dearborn, MI (US); Ryan Edwin Hanson, Livonia, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 18/475,810

(22) Filed: Sep. 27, 2023

(65) Prior Publication Data
US 2025/0104469 A1 Mar. 27, 2025

(51) Int. Cl.
*G06V 40/16* (2022.01)
*G06V 20/58* (2022.01)
*H04W 4/40* (2018.01)

(52) U.S. Cl.
CPC ............ *G06V 40/172* (2022.01); *G06V 20/58* (2022.01); *H04W 4/40* (2018.02)

(58) Field of Classification Search
CPC ........ G06V 40/172; G06V 20/58; H04W 4/40
See application file for complete search history.

(56) References Cited

U.S. PATENT DOCUMENTS

| | | | |
|---|---|---|---|
| 7,602,947 B1 | 10/2009 | Lemelson et al. | |
| 10,850,709 B1 | 12/2020 | Nagata et al. | |
| 2002/0097145 A1* | 7/2002 | Tumey | B60R 25/255 340/5.53 |
| 2009/0181640 A1* | 7/2009 | Jones | G08B 25/08 455/404.2 |
| 2009/0243798 A1* | 10/2009 | Fukuda | G06V 40/107 340/5.82 |
| 2015/0025917 A1* | 1/2015 | Stempora | G02B 27/0093 705/4 |
| 2016/0286159 A1 | 9/2016 | Kovac | |
| 2018/0009417 A1* | 1/2018 | Hoyos | H04L 63/102 |
| 2020/0406859 A1 | 12/2020 | Hassani | |
| 2021/0287017 A1* | 9/2021 | Turk | G07C 5/0866 |
| 2024/0412524 A1* | 12/2024 | Petrey, Jr. | G06V 20/63 |

FOREIGN PATENT DOCUMENTS

CN            112511754 A        11/2021

* cited by examiner

*Primary Examiner* — Iriana Cruz
(74) *Attorney, Agent, or Firm* — Frank Lollo; Price Heneveld LLP

(57) ABSTRACT

A monitoring system for a vehicle environment includes a biometric sensor that captures biometric information of a participant, a database that stores biometric data of a security event cohort, and control circuitry in communication with the biometric sensor. The control circuitry is configured to compare the biometric information to the biometric data to detect one or more matches, communicate an indication of a result of the comparison of the biometric information to the biometric data in one of a first privacy mode and a second privacy mode, and select between the first privacy mode and the second privacy mode based on the result.

20 Claims, 5 Drawing Sheets

BIOMETRIC IDENTIFICATION IN A VEHICLE ENVIRONMENT

FIELD OF THE DISCLOSURE

The present disclosure generally relates to biometric identification in a vehicle environment and, more particularly, to detection of security events based on biometric comparisons of individuals in a vehicle environment.

BACKGROUND OF THE DISCLOSURE

Conventional systems for detecting false identification for a security event may be limited.

SUMMARY OF THE DISCLOSURE

According to a first aspect of the present disclosure, a monitoring system for a vehicle environment includes a biometric sensor that captures biometric information of a participant, a database that stores biometric data of a security event cohort, and control circuitry in communication with the biometric sensor. The control circuitry is configured to compare the biometric information to the biometric data to detect one or more matches, communicate an indication of a result of the comparison of the biometric information to the biometric data in one of a first privacy mode and a second privacy mode, and select between the first privacy mode and the second privacy mode based on the result.

Embodiments of the first aspect of the present disclosure can include any one or a combination of the following features:

the database is located in a server remote from the vehicle environment and the biometric information is communicated wirelessly from the vehicle environment to the server;

the first privacy mode limits communication of the result from the participant relative to the second privacy mode;

the security event cohort includes an identity of an individual assigned with at least one of an active warrant and a missing person report;

the control circuitry is configured to select the first privacy mode when the result includes the one or more matches and the second privacy mode when the result does not include a match;

the communication in the first privacy mode includes presenting the indication of the result at a mobile device of an administrator of the monitoring system, and wherein the communication in the second privacy mode includes presenting the indication of the result at a vehicle display in a vehicle interior;

the biometric sensor includes a scan area directed to a region external to the vehicle;

the biometric sensor includes a camera and an image processor configured to extract facial features from an image captured by the camera;

a door handle and a sensor coupled to the door handle configured to detect manual engagement of the door handle and wherein the control circuitry is configured to activate the biometric capturing in response to manual engagement of the door handle;

the control circuitry is configured to communicate a signal to indicate capture of the biometric information; and at least one of a visual and an audible transmission unit installed in a vehicle of the vehicle environment, wherein the control circuitry is configured to control the at least one of the visual and the audible transmission unit to align a portion of the participant with the biometric sensor.

According to a second aspect of the present disclosure, a monitoring system for a vehicle environment includes a biometric sensor that captures biometric information of a participant, a database located in a server remote from the vehicle environment and storing biometric data of a security event cohort, and control circuitry in communication with the biometric sensor. The control circuitry is configured to compare, remote from the vehicle environment, the biometric information to the biometric data to detect one or more matches, communicate an indication of a result of the comparison of the biometric information to the biometric data in one of a first privacy mode and a second privacy mode, and select between the first privacy mode and the second privacy mode based on the result. The biometric information is communicated wirelessly from the vehicle environment to the server.

Embodiments of the first aspect of the present disclosure can include any one or a combination of the following features:

the first privacy mode limits communication of the result from the participant relative to the second privacy mode;

the security event cohort includes an identity of an individual assigned with at least one of an active warrant and a missing person report;

the control circuitry is configured to select the first privacy mode when the result includes the one or more matches and the second privacy mode when the result does not include a match;

the communication in the first privacy mode includes presenting the indication of the result at a mobile device of an administrator of the monitoring system and wherein the communication in the second privacy mode includes presenting the indication of the result at a vehicle display;

the biometric sensor includes a camera and an image processor configured to extract facial features from an image captured by the camera;

a door handle and a sensor coupled to the door handle configured to detect manual engagement of the door handle and wherein the control circuitry is configured to activate the biometric capturing in response to manual engagement of the door handle; and the control circuitry is configured to communicate a signal to indicate capture of the biometric information.

According to a third aspect of the present disclosure, a monitoring system for a vehicle environment includes a biometric sensor that captures biometric information of a participant and a database located in a server remote from the vehicle environment and storing biometric data of a security event cohort. The security event cohort includes an identity of a person assigned with at least one of an active warrant and a missing person report. The monitoring system includes control circuitry in communication with the biometric sensor. The control circuitry is configured to compare the biometric information to the biometric data to detect one or more matches, communicate an indication of a result of the comparison of the biometric information to the biometric data in one of a first privacy mode and a second privacy mode, select the first privacy mode when the result includes the one or more matches and the second privacy mode when the result does not include a match in the second privacy mode, in the first privacy mode, present the indication of the result at a mobile device of an administrator of the monitoring system, and in the second privacy mode, present the indication of the result at a vehicle display in a vehicle interior.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
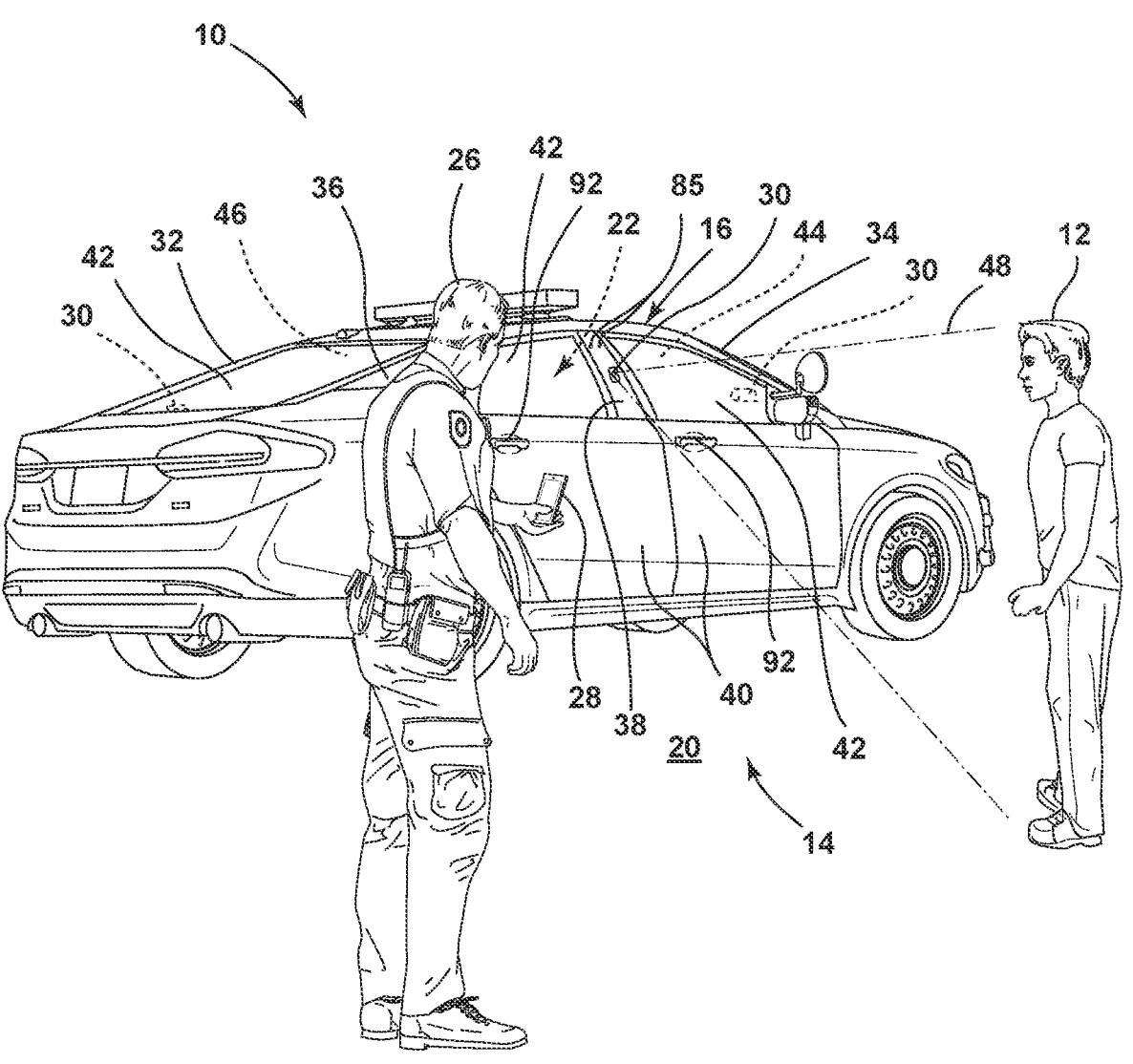
FIG. 1 is a perspective view of a vehicle environment illustrating an exemplary application of a monitoring system.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale, and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to biometric identification in a vehicle environment. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-5, a monitoring system 10 that performs recognition of at least one individual 12 in a vehicle environment 14 is used to detect security events. The monitoring system 10 may be implemented by security agencies, (e.g., police, border patrol) and utilize sensors on, in, or around a vehicle 16. Biometric information captured by the sensors may be communicated to a remote server 18 that compares the biometric information to biometric data of previously identified individuals 12. Based on this comparison, the monitoring system 10 can detect a security event, such as the locating of a missing person, the locating of a suspect of a crime, the detection of untrue aliases, or any other security event determined by comparing the information captured in the vehicle environment 14 to stored or previously captured data for a security event cohort. As will be described further herein, the sensors can include image-based sensors or other sensors mounted to the vehicle 16 or around an exterior 20 of the vehicle 16 and/or an interior 22 of the vehicle 16. By utilizing a local vehicle environment network 24, sensors on an administrator/user 26 of the monitoring system 10 (e.g., security personnel) and/or sensors on a mobile device 28 (e.g., a smartphone, a tablet, a smartwatch) of the user 26 may be used to capture the biometric information, which may be communicated to the remote server 18 via an encrypted connection from a computer within the vehicle 16. Thus, the monitoring system 10 provides for an encrypted communication from the vehicle environment 14 to the remote server 18.

It is contemplated that the user 26 of the monitoring system 10 may be alternatively referred to as an administrator 26 and the individual 12 described herein may alternatively be referred to as a participant 12. For example, the administrator 26 may manage operation of the monitoring system 10 (activation/deactivation of scanning), and the individual 12 may be scanned by the monitoring system 10.

Referring now to FIG. 1, an example of capturing biometric information of an individual 12 in the vehicle environment 14 is illustrated in the exterior 20 of the vehicle 16 utilizing one of a plurality of external cameras 30 for detection of the biometric information. The vehicle 16 in the vehicle environment 14 may be a patrol vehicle or any other vehicle 16 that includes scanning features and has an encrypted connection for comparison of the biometric data to biometric information stored in the remote server 18. The vehicle 16 includes a frame 32 or support that includes a plurality of support members 34, 36, 38 that may be oriented upright for supporting doors 40 and windows 42 of the vehicle 16. For example, the support members 34, 36, 38 may include a front support member 34, a rear support member 36, and a middle support member 38 between the front and rear support members 34, 36. The middle support member 38 divides, or aligns with a divide for, the vehicle 16 into front and rear compartments 44, 46 of the vehicle 16. In the example in which the vehicle 16 is a patrol vehicle, a physical divider may separate the front compartment 44 from the rear compartment 46 within the interior 22 of the vehicle 16. In the illustrated example, one of the exterior cameras 30 is coupled to or disposed within the middle support member 38 of the frame 32 and is configured with a field of view 48 in front of the middle support member 38. It is contemplated that other cameras may be located for capturing scans of the exterior 20 of the vehicle 16, such as front and rear external cameras 30 or any other imaging device around the vehicle 16.

Although the biometric sensor is illustrated as an external camera 30 in the present example, it is contemplated that other types of sensors may be used for gathering the biometric information of the individual 12. For example, and as will be described with respect to FIG. 2, the sensor may include an interior camera 50, a fingerprint scanner 52, an iris scanner 54, microphones 56, 58, RADAR (radio detection and ranging), LiDAR (light detection and ranging) or any other sensor that can detect biometric features of the individual 12. Such sensors may be located on the exterior 20 of the vehicle 16, or as will be demonstrated in reference to FIG. 3, within the interior 22 of the vehicle 16. In general, the information captured by the sensor(s) is used by the monitoring system 10 to recognize the individual 12 and return any data, alerts, or instructions to the user 26 of the monitoring system 10. As will be discussed further herein, the return data may be presented in various ways (e.g., with varying levels of privacy) depending on the results of the comparison.

Still referring to FIG. 1, the user 26 of the monitoring system 10 may be security personnel, such as a police officer, a border patrol agent, or other security personnel. A body-mounted camera (bodycam 60) may be provided on clothing of the security personnel and may be configured to capture audio, video, and/or images of the vehicle environment 14, in response to actions taken by the user 26 and/or in response to conditions of the vehicle 16, movement of the user 26 or the individual 12, or other situation-driven events in which the bodycam 60 can be automatically activated in a scanning mode. The user 26 may also use the mobile device 28 previously described to capture the biometric information. Either or Both the bodycam 60 and the mobile device 28 may be used to capture the biometric information of the individual 12 and communicate the biometric information within the vehicle environment network 24, as will be described in reference to FIG. 2. The vehicle environment network 24 may be a secure network that limits communication outside of the vehicle environment network 24 to authorized devices, such as the remote server 18, that may be in a security environment, such as a police station or another security environment. Further, the information communicated within the vehicle environment network 24 may be encrypted, such that access to the vehicle environment network 24 is inaccessible without proper credentials. As will be described further in reference to FIG. 2, the mobile device 28 may have other sensors and/or software applications for detecting the biometric information of the individual 12 which may be used in tandem with or in the alternative of the sensor mounted to the vehicle 16 (e.g., the exterior camera 30).

Figure 2:
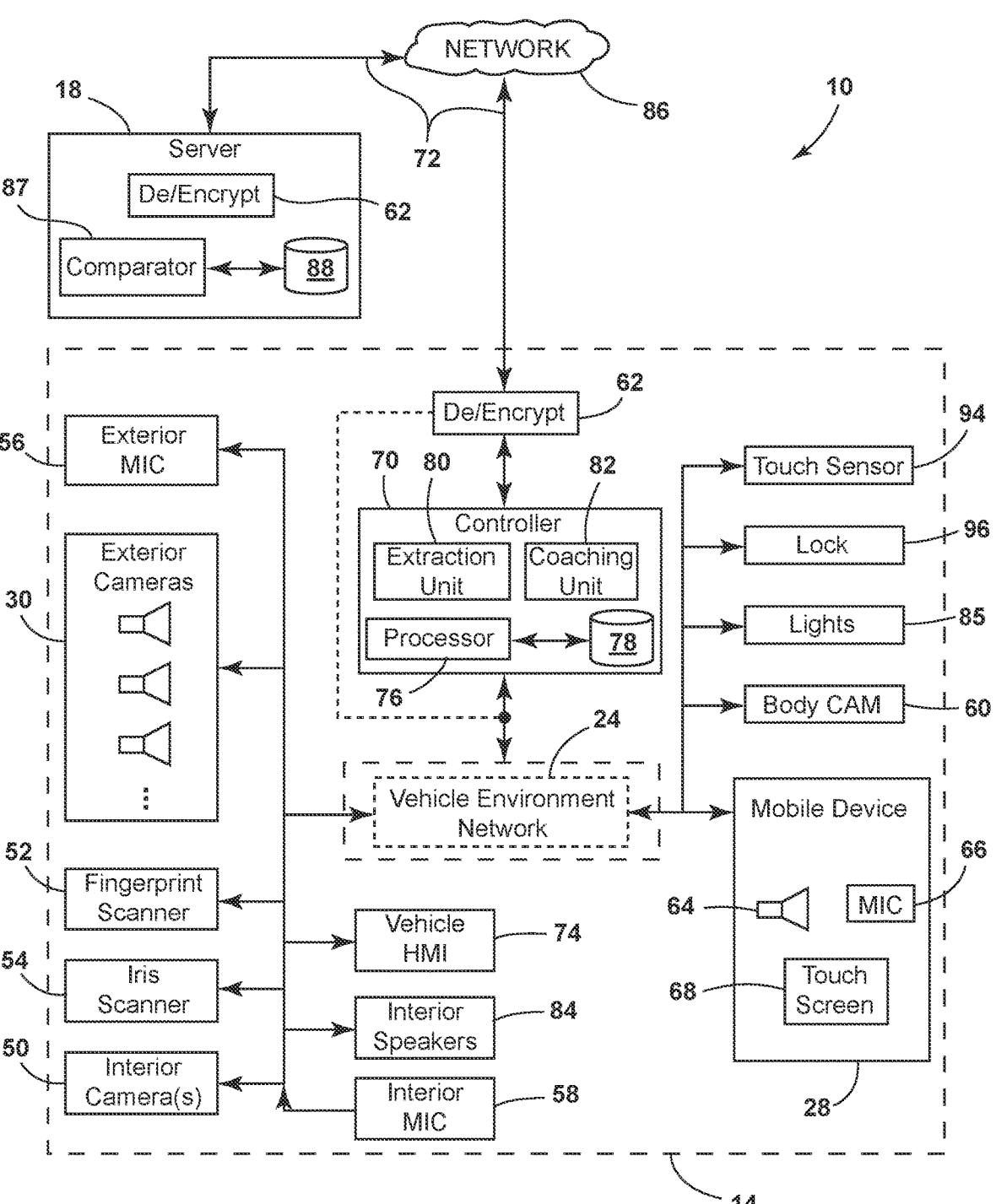
FIG. 2 is a functional block diagram of a monitoring system for a vehicle environment.

Referring now to FIGS. 1 and 2, The monitoring system 10 is configured to manage communications between the vehicle environment network 24 and the remote server 18 via one or more encryption and/or de-encryption methods. For example, the monitoring system 10 includes at least one encryption module 62 that encrypts the data to limit readability of digital communications on the vehicle environment network 24. A second encryption module 62 is provided in the server 18 for de-encrypting the information captured at the sensor and communicated to the server 18. Exemplary encryption processes include data encryption methods that involve transforming data into a coded form to prevent unauthorized access. Exemplary encryption techniques include symmetric encryption that may use a single key to both encrypt and decrypt the data (e.g., Advanced Encryption Standard (AES) or Data Encryption Standard (DES)), asymmetric encryption that employs a public key for encryption and a private key for decryption (e.g., Rivest-Shamir-Adleman (RSA) algorithm or Elliptic Curve Cryptography (ECC)), hash functions that generate a fixed-size output, or hash, from an input data (e.g., MD5 or SHA-256), and/or hybrid encryption that combines symmetric and asymmetric encryption methods using a symmetric key hat is encrypted based on the recipient's public key. Two-factor authentication may be used in addition or in an alternative to these exemplary encryption methods.

The sensor can include interior sensors and exterior sensors. For example, the sensors can include an exterior microphone 56, an interior microphone 58, an interior camera 50, the one or more exterior cameras 30, the fingerprint scanner 52, the iris scanner 54, RADAR, LiDAR, and/or any other sensing device configured to capture the biometric information about the individual 12. The fingerprint scanner 52 may be configured to detect patterns of friction ridges on the fingers of the individual 12 and communicate the pattern to the remote server 18 for comparison to other biometric data stored or the remote server 18. The iris scanner 54 may use color and/or appearance differences in irises of humans. In another example, a retinal scanning sensor is provided which may be ocular-based and detect unique patterns on retina blood vessels of the individual 12. These exemplary biometric data capturing techniques may employ infrared and/or near-infrared light to acquire detailed imaging of retina blood vessels of the individual 12. In addition or in an alternative, scanners for capturing visual images, capacitive or CMOS scanners used to detect electrical current, ultrasonic scanners, or thermal scanners may be used to capture the biometric information about the individual 12. Further, RADAR and/or LiDAR may be used to capture height, body type, girth, estimated weight, and other body biometric attributes of the individual 12. With regard to image processing techniques of facial features to identify the individual 12, neural networks and/or machine learning models trained to classify facial features with identity may be used, such as models that execute feature extraction and feature matching and/or use a Viola-Jones detection framework. Other identification techniques based on image processing may be employed by the monitoring system 10 for comparison to the biometric data stored in the remote server 18.

In some examples, innate and/or externally-applied visual qualities of the individual 12 may be detected by the monitoring system 10 using one or more of the cameras 30, 50, 64. For example, tattoos, scars, piercings (e.g., earrings, nose rings, lip rings, etc.), active wounds, height, hair color, non-facial skin color, gait, and clothes color/style, or other identifiable features for assisting the user 26 in identifying the individual 12 may be detected and included in data transmitted for comparison to the cohort. For example, a face tattoo may be detected and classified based on images from one or more of the cameras 30, 50, 64, and such data may be communicated to the server 18 for comparison to the cohort. It is further contemplated that, while images of the cohort may be stored in the server 18 for comparison, keywords associated with members of the cohort may also be stored for comparison. For example, "nose piercing," "face tattoo," a height, an ethnicity, or other identifying features may be key terms stored for an all-points bulletin of a member of the cohort while an image of the member is not yet stored. Using the cameras 30, 50, 64 of the monitoring system, such key terms may be extracted from the images for automatic searching/comparison within the server 18.

Still referring to FIGS. 1 and 2, the mobile device 28 employed by the user 26 may include one or more cameras 64, such as a forward-facing camera and a rear-facing camera, at least one microphone 66, and/or a touchscreen 68 for interacting with the mobile device 28. In capturing of the biometric information of the individual 12, one or both of the forward/rear cameras 64 of the mobile device 28, the microphone 66 of the mobile device 28, and/or the touchscreen 68 on the mobile device 28 may be employed. For example, the forward/rear cameras on the mobile device 28 may be used in a similar fashion to the exterior cameras 30 of the vehicle 16 and/or the interior camera 50 of the vehicle 16 (e.g., for capturing images or sounds). The images and/or sounds may then be processed by control circuitry on the vehicle environment network 24 and/or the remote server 18 for extraction of the biometric information. The touchscreen 68 may be employed for interaction by the individual 12, such as by the individual 12 placing a finger on the touch screen to allow the mobile device 28 to detect the pattern for fingerprint detection. Further, the bodycam 60 of the user 26 may be employed for capturing similar audio and/or video information for detection of the biometric information of the individual 12.

As demonstrated in FIG. 2, the various sensors detecting biometric information may be communicatively coupled with a controller 70 in the vehicle environment 14 via the vehicle environment network 24. In this way, the data transmitted amongst the biometric sensors can be encrypted and generally free from transmission outside of the vehicle environment 14 with the exception of an encrypted transmission node 72 between the vehicle environment 14 and the remote server 18. It is contemplated that the encrypted vehicle environment network 24 can have wired and/or wireless communication technologies, such as CAN, TCP/IP, Ethernet®, Wi-Fi®, Bluetooth®, ZigBee®, or any other wired or wireless communication protocol and may have additional layers of encryption to limit infiltration of the vehicle environment network 24. The controller 70 can include one or more computing devices such as a multicore processor, random access memory (RAM), read-only memory (ROM), and any other computational devices. For example, the controller 70 may be part of a computer, such as a laptop stored in the front compartment 44 of the vehicle 16 for interaction by the user 26 when communicating with other security personnel. In another example, the controller 70 is installed in the vehicle 16 and the user 26 accesses operation of the controller 70 via a vehicle human-machine (HMI) 74 on the vehicle environment network 24. Thus, the controller 70 may be a separate device removable from the vehicle 16 or may be installed in the vehicle 16. In either example or in other examples in which the controller 70 is used, the controller 70 can include some form of user interface, such as a keyboard, a mouse, or another haptic/tactile interface (e.g., a touch-sensitive display).

The controller 70 can include a processor 76 and a memory 78 that stores instructions for execution by the processor 76. The biometric information may be extracted via an extraction unit 80 within the controller 70, which may be another processor 76 or part of the processor 76 of the controller 70. For example, the extraction unit 80 may include a fingerprint extraction module, a facial feature extraction module, an audio processing device for recognizing voice, words (e.g., names), a cadence, a tone, a pitch, or another verbal signature associated with an identity of an individual 12, or another biometric extraction algorithm. Thus, the extraction unit 80 can be employed for one or more of image, video, and/or audio processing methods to detect the biometric information. It is contemplated that, in other examples, the extraction unit 80 is employed in a separate controller from the controller 70 demonstrated in FIG. 2. For example, the mobile device 28 may include an image processing system and or other biometric processing system that may extract the features for comparison in the remote server 18. In general, detection of the biometric information from the biometric sensors may be performed by control circuitry on the vehicle environment network 24 (e.g., the controller 70, combinations of controllers on the mobile device 28 or other computing devices, etc.).

Still referring to FIG. 2, it is contemplated that the memory 78 may only temporarily store any biometric information processed by the processor 76 and/or the extraction unit 80 during a biometric scanning mode. For example, following the biometric mode and returning to non-operation or limited operation (e.g., door access mode) of the biometric sensors, any biometric information stored in the memory 78 within the vehicle environment 14 may be deleted or instructed to be deleted or overwritten by the processor 76.

In some examples, a subset of the cohort data may be stored locally on the vehicle environment network 24 based on a status of the members of the cohort to limit the effects of connectivity interruptions with the security environment (e.g., the remote server 18). For example, biometric information pertaining to members of the cohort having a listed residence or associated area near a travel route of the vehicle 16 may be stored in the memory 78. Such storage may be downloaded from the server 18 and temporarily stored in preparation for a patrol in a designated area. In some examples, the automatic downloading of some or all of the cohort data is based on limited wireless service in a target patrol area, such as remote rural areas or areas with limited cellular communication service or the like. In other examples, downloading or local storing of the biometric information of the cohorts on the vehicle environment network 24 is based on a magnitude of past security events, the status of an active warrant, missing persons report, or an all-points bulletin, or the like. In this way, local storage on the vehicle environment network 24 may be based on various factors related to the members of the cohort.

The controller 70 can also include a coaching unit 82 that is configured to interact with the biometric sensors as well as output devices, such as vehicle speakers 84 (e.g., interior or exterior speakers), displays (e.g., of the vehicle HMI 74, a display of the mobile device 28), indicators (e.g., lights 85, such as LEDs), haptic feedback (e.g., a vibration mechanism within the mobile device 28, vibration mechanisms within the vehicle HMI 74), or the like. In general, the coaching unit 82 is configured to process the data captured by the biometric sensors and communicate, via one or more of the output devices, instructions or indications to align the individual 12 within an accessible range, or scan area, for detection by the biometric sensor(s) and/or to instruct the user 26 as to how to instruct the individual 12 to align within the accessible range for detection by the biometric sensor(s). By way of example, the coaching unit 82 can be configured to communicate instructions causing the speakers 84 of the vehicle 16 to output a voice message instructing the individual 12 to step in front of the exterior camera 30 (e.g., FIG. 1), keep a still pose, align eyes of the individual 12 with the biometric sensor, speak into one or more of the microphones 56, 58, or otherwise verbally or visually instruct the participant 12 to align his/herself within the accessible range. In another example, instructions are communicated to the display of the user 26 (e.g., a display of the mobile device 28 or the vehicle HMI 74) to instruct the user 26 to communicate to the individual 12 where to move or what to do to gather the biometric information. In another example, the instructions communicated to the user 26 may be coded so as to not disclose to the individual 12 the information being communicated to the user 26 (e.g., if the biometric information search reveals the individual 12 has an active warrant for their arrest, the match may be disclosed privately to the user 26 via either code words, color codes, or audio tones).

For example, if one or more matches are detected, a word starting with a specific letter may be presented audibly or visually. Thus, the coaching unit 82 is in communication with the extraction unit 80 to detect whether the biometric information was gathered by the biometric sensor.

Still referring to FIG. 2, the biometric information is encrypted and communicated via a wireless network 86 to the remote server 18 where it is de-encrypted and processed in a comparator 87 of the server 18. The comparator 87 is in communication with a security event database 88 that stores security event information containing biometric data of the security event cohort. The comparator 87 may include one or more processors, such as image processors, audio processors, or any type of processor previously described in relation to the control circuitry within the vehicle environment 14. The comparator 87 compares the biometric information of the individual 12 to the biometric data of a cohort using the security event database 88. Examples of the cohort include missing persons, persons with warrants, criminal persons, persons with criminal history, persons with an all-points bulletin having a lookout description, and/or other persons associated with security events. Thus, in operation, the comparator 87 may detect one or more matches based on the comparison of the biometric information to the biometric data and communicate the one or more matches, via encrypted methods, through the wireless network 86 to the vehicle environment network 24. As will be described further herein, the results of the comparison (e.g., search results 90, see FIG. 5) are presented to the user 26 based on the number or quality of the results.

It is contemplated that the comparator 87 and/or the extraction unit 80 and/or the coaching unit 82 may be communicatively coupled with the control circuitry in any encrypted way. For example, some or all of the comparator 87, the extraction unit 80, and the coaching unit 82 can be remote from the vehicle environment 14 or within the vehicle environment 14. Further, these modules may be distributed within the control circuitry, such that one or more of the extractions, comparisons, coaching determinations can be made within the vehicle environment 14 or at the server 18.

It is contemplated that, in some examples, the type of biometric information communicated to the remote server 18 differs in data type from the data type stored within the security event database 88. For example, if image data is communicated (e.g., facial feature locations and qualities) to the server 18, along with a string of text including a name given by the individual 12 to the user 26, the comparator 87 may determine that there is no image data associated with that given name but that there is fingerprint data associated with the given name. It is also contemplated that identifying plating on the vehicle 16 may be used by the comparator 87 to search for matches (e.g., to detect identities associated with a particular vehicle of plating). The server 18 may communicate a request to the controller 70 and/or to any output device on the vehicle environment network 24 to request a different form of biometric data (e.g., fingerprint data) based on the results. In this way, the monitoring system 10 may provide multiple options for detecting security events in the vehicle environment 14.

Still referring to FIGS. 1 and 2, in an exemplary embodiment, initiation of a scanning mode for the biometric sensors includes user interaction with a handle 92 of one of the doors 40 on the vehicle 16 and the lights 85 mounted on the vehicle 16. For example, to initiate scanning, the user 26 may hold the handle 92 for a period of time, which may be detected by a touch sensor 94 in communication with the controller 70 on the vehicle environment network 24. When the time exceeds a certain threshold, the indicators may illuminate to indicate scanning by the biometric sensor of the individual 12. For example, and with reference to FIG. 1, a plurality of indicators may be provided for indicating different statuses of the monitoring system 10. For example, a first indicator may indicate active scanning of the monitoring system 10, and a second indicator may indicate success or a lack of success in detecting the biometric information after a set period of time. The indicators may also illuminate to indicate alignment of the individual 12 within the accessible range (e.g., the field of view 48 of the external camera 30). By way of example, the coaching unit 82 may flash the indicators in a specific sequence or color to indicate for the individual 12 to move to the left, to the right, forward, backward, or otherwise align the face of the individual 12 or eye with the biometric sensor. As will be described in reference to the foregoing figures, an electrical lock 96 for the doors 40 may be controlled by the controller 70 in response to the results of the comparison or as part of the biometric activation steps.

Figure 3:
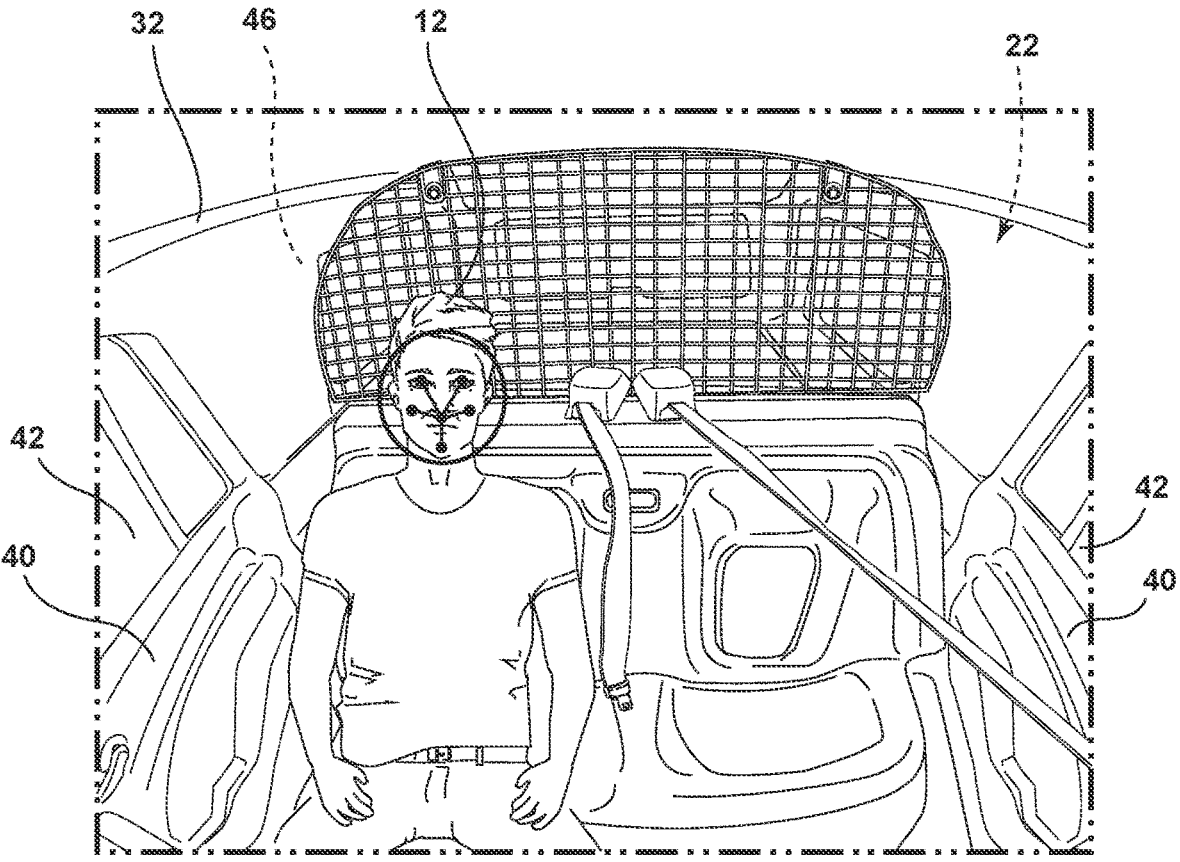
FIG. 3 is an exemplary image captured of a vehicle interior having facial feature extraction overlaid over an individual in the vehicle interior.

Referring now to FIG. 3, an exemplary image from the perspective of an interior camera 50 mounted between the front and rear compartments 44, 46 is demonstrated. In this example, the facial features extracted by the monitoring system 10 are illustrated overlaying the image of the occupant 12. For example, the facial features of the eyes, the mouth, the cheekbones, the chin, or any other facial features may be extracted, and their positions interrelated to produce the biometric information for comparison to the biometric data in the security event database 88. While the individual 12 in FIG. 3 is illustrated as looking forward in a direction accessible to capturing the biometric information, it is contemplated that movement of the individual 12 and orientations of the individual 12 may limit the ability for the biometric information to be captured. Accordingly, the coaching unit 82 may detect the lack of collecting the biometric information and communicate via the speakers 84 and/or visual feedback Instructions to align with the accessible range for extraction of the biometric information.

Figure 4:
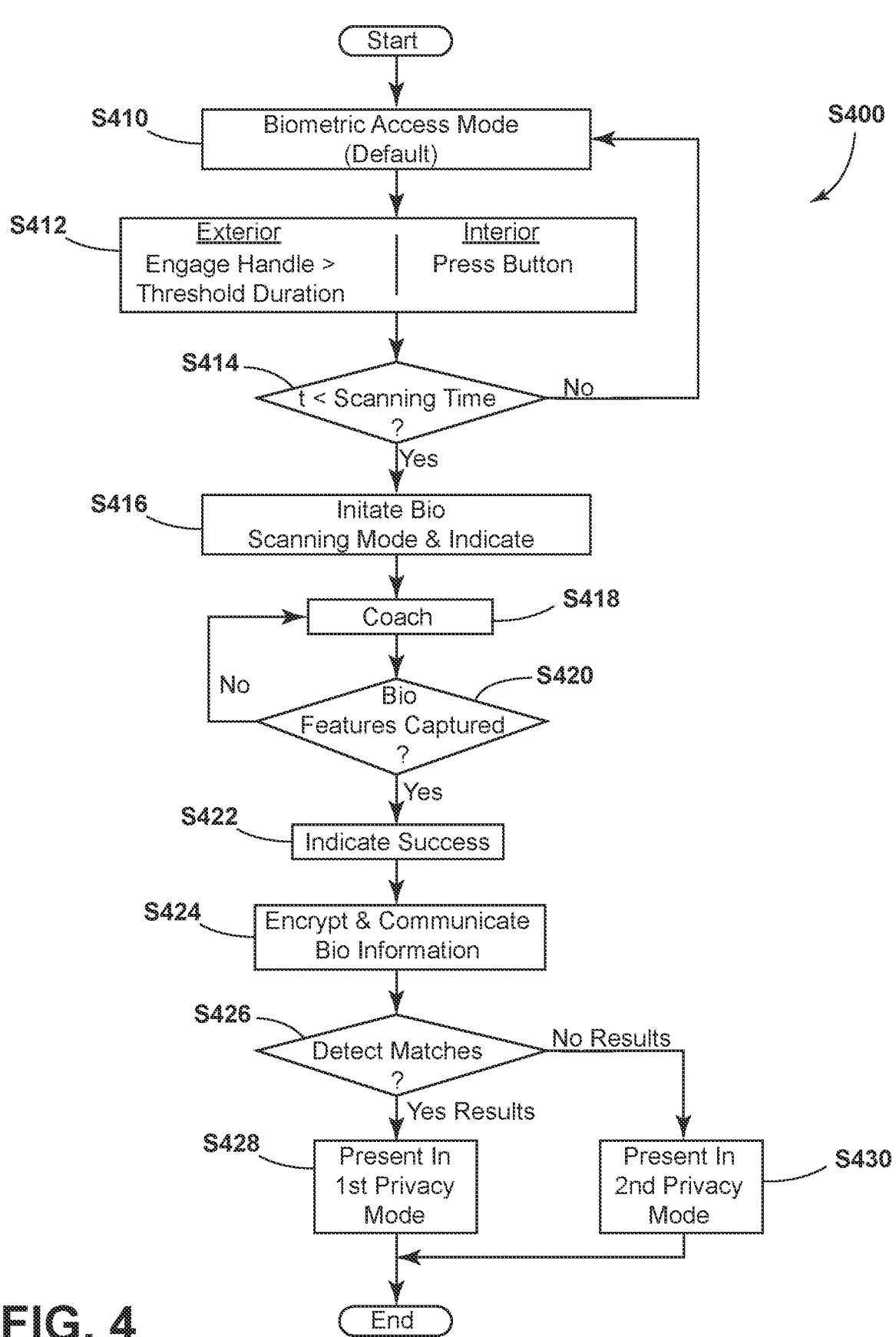
FIG. 4 is a process for detecting a security event carried out by the monitoring system according to one aspect of the present disclosure.

Referring now to FIG. 4, an exemplary process carried out by the monitoring system 10 is demonstrated utilizing the biometric sensors and output devices previously described with respect to FIGS. 1-3. At step S410, the monitoring system 10 may be in a biometric access mode in which the doors 40 of the vehicle 16 are locked (via the lock 96) and unlockable in response to biometric detection of an authorized person. To activate the biometric scanning mode from the exterior 20, the user 26 can engage an interface at step A412. For example, if the monitoring system 10 is used in the environment exterior to the vehicle 16 (e.g., FIG. 1), the process may be initiated by the user 26 engaging the handle 92 of the door 40 for more than a threshold duration. For example, the user 26 may generally align the individual 12 with the biometric sensor and engage a front or rear door handle of the vehicle 16 for more than 5 seconds and, following engagement of the door handle for five seconds, the biometric scanning mode at the middle support member 38 of the vehicle 16. In the example of interior biometric acquisition, the biometric scanning mode may be activated by the user 26 pressing a button, such as a hard or soft button within the vehicle 16 or on the mobile device 28 to initiate biometric acquisition. It is contemplated that the biometric acquisition may be any one of the image-capturing, fingerprint pattern recognition capturing techniques, or any other identification technique.

The location of the biometric sensor relative to the handle 92 may provide enhanced security for the vehicle environment 14. For example, the handle 92 may be within an arm's length of the biometric sensor. Thus, the arrangement of the biometric sensor near the handle 92 allows the biometric scanning to be in a controlled environment and the data to be processed on the vehicle environment network 24. At step S414, a runtime for the biometric scanning mode is tracked and compared to a maximum scanning time before disengaging of the biometric scanning mode. For example, if the biometric information is not captured within 60 seconds, the monitoring system 10 may return to the biometric access mode. It is contemplated that the biometric access mode may be any mode where identification features are scanned to determine authorization for a user 26 to open the vehicle 16. For example, the biometric access mode may use any of the previous biometric scanning sensors previously described to authorize the user 26 to enter the front compartment 44 of the vehicle 16 to operate the vehicle 16. By providing the handle engagement feature, the user 26 may dynamically adjust between the biometric access mode and the biometric scanning mode that accesses the remote server 18. In this way, the monitoring system 10 may toggle between communicating biometric information to the remote server 18 and performing local comparisons within the vehicle environment network 24 based on stored biometric information related to authorized users 26. Accordingly, the memory 78 previously described in the controller 70 of the vehicle environment network 24 may be configured to maintain biometric information of authorized users 26, such as security personnel that typically operate security vehicles, whereas storage of the biometric information of the individual 12 may be deleted.

At step S416, the biometric scanning mode is initiated and indicated via one or more of the indicators previously described. For example, in the example of an exterior biometric scanning mode, the lights 85 on the middle support member 38 are activated and/or an exterior speaker 84 indicating instructions for the individual 12 to align with the biometric sensor is activated. In either the interior or exterior example, at step S418, the coaching unit 82 may be activated to communicate to the individual 12 to align with the accessible range (e.g., the field of view 48, placement of a finger, alignment of an eye of the individual 12 with an iris or retinal scanner). As previously described, in an alternative, the coaching unit 82 may communicate instructions to the user 26 to indicate to the user 26 how the individual 12 should be aligned. In this example, the user 26 can guide the individual 12, in tandem with or in an alternative to instructions from the speaker 84 of the vehicle 16, to perform a particular head pose, instruct the individual 12 to open his/her eyes, limit motion of the individual 12, or otherwise to align the user 26 to ascertain the biometric information. And step S420, if the biometric features are not captured as determined by the controller 70 or another part of the control circuitry, the coaching unit 82 may again be initiated to provide feedback as to how to correct the alignment of the individual 12. For example, the individual 12 may be looking to the left or to the right to reveal some facial features but not all facial features for image-capturing biometric scanning. The coaching unit 82 may communicate with the extraction unit 80 to determine that the individual 12 should turn his/her head 90 degrees to face the external camera, and this audible or visual instruction may be communicated.

If the biometric features are successfully captured, as determined by the controller 70 of the monitoring system 10, the lights 85 may flash or otherwise alternate in color to indicate successful capture of the biometric information such that the user 26 may wait for results from the comparator 87. During this time, at step S424, the biometric information is encrypted or remains encrypted on the vehicle environment network 24 and is communicated to the remote server 18 for comparison by the comparator 87. Upon comparison at step S426, the server 18 may communicate the results, in an encrypted form, back to the vehicle environment network 24. The results of the search are then presented to the user 26 in one of a first privacy mode (S428) and a second privacy mode (S430). For example, if there are no hits, (S430), a lower degree of privacy may be applied for presentation of the results. If results are detected (S428), a higher degree of privacy may be applied for presentation of the results. While only two privacy modes are described herein, it is contemplated that any number of privacy modes may be used by the monitoring system 10 depending on the magnitude of the security events matching in the remote server 18, the likelihood of a match (e.g., a quality or a quantity of the search results), or the like.

By way of example, the first and second privacy modes may have differing levels of privacy for the presentation of the results. For example, the first privacy mode may include displaying images of the search results 90 at the vehicle HMI 74. In another example, the first privacy mode may be display of images of the search results 90 at the mobile device 28 of the user 26. In other examples, the first privacy mode includes audible presentation of the results. For example, the speakers 84 of the vehicle 16, speakers 84 of the mobile device 28, or any other audible device (e.g., an earpiece worn by the user 26), may present a verbal message saying quote "MISSING PERSON", "ACTIVE WARRANT", "ON PAROLE", "ON PROBATION", and/or the like. In another example, the instructions communicated to the user 26 may be coded so as to not disclose to the individual 12 the information being communicated to the user 26 (e.g., if the biometric information search reveals the individual 12 has an active warrant for their arrest, the match may be disclosed privately to the user 26 via either code words, color codes, or audio tones). For example, if one or more matches are detected, a word starting with a specific letter may be presented audibly or visually. In this example, a level of surety has been reached by the comparator 87 to determine that there was an exact match of the identity of the individual 12 to the identity of an individual 12 on file with the remote server 18. However, it is contemplated that a plurality of search results 90 may be included in the search, as the identity of the individual 12 may still be undocumented in the security event database 88. For example, and with reference to FIG. 5, search results 90 may be presented to the user 26 on the mobile device 28 and/or the vehicle HMI 74 that may be manually processed by the user 26. For example, facial features captured by the biometric sensor may have a correlation to a number of individuals 12 having biometric data stored in the security event database 88. Thus, in the current example, the user 26 may navigate through the search results 90 to find a match of the individual 12. In some examples, information provided to the user 26, such as the individual's supposed name, date of birth, or other information given to the user 26 may be utilized by the user 26 to compare to the search results 90 to detect a match. In this way, the monitoring system 10 may enhance interaction with the user 26 to identify security events.

Referring back to FIG. 4, the privacy modes for presentation of the results may be based on the magnitude (e.g., the nature of security event) of previously occurring security events by the individual 12 and/or individuals 12 identified in the search. For example, if there is an active warrant for one of the search results 90 returned to the vehicle environment network 24, the search results 90 may be presented only visually to the user 26 at the mobile device 28 and limited from view by the individual 12. However, if no results are returned by the monitoring system 10, the speakers 84 may indicate that there were no results and/or visual presentation at a vehicle HMI 74, which may be viewable by the individual 12. Stated differently, the monitoring system 10 may be used to detect a security event (e.g., locating of a missing person or a criminal) and present such detection in an individualized way (e.g., in a specific privacy mode) based on the comparisons by the comparator 87. In this way, indications of a security event may only be presented to the administrators 26 and not to the participants 12 of the monitoring system 10 and monitoring methods described herein.

Still referring to FIG. 4, during the biometric scanning mode from the exterior 20 of the vehicle 16, the locks 96 of the doors 40 may be engaged to limit the ability of an individual 12 to access the front compartment 44 of the vehicle 16 to operate the vehicle 16. As the biometric features are attempted to be captured at step 420, coaching may be provided on a software application of the mobile device 28 of the user 26 to aid the user 26 in navigating alignment or cooperation of the individual 12. Further, although not demonstrated in FIG. 4, the biometric access mode may be returned to manually instead of based on a time elapsing by the user 26 pressing and holding the door handle again (e.g., flagging the touch sensor 94) for above the threshold duration (e.g., 5 seconds). It is contemplated that the time limits described herein are not limiting and are merely exemplary. For example, shorter or longer times than 5 seconds may be used to initiate the biometric scanning mode. Further, other initiation methods may be employed, such as interaction with the vehicle HMI 74 as previously described and/or interaction with the mobile device 28. It is also contemplated that the biometric sensor may be in other locations of the vehicle 16, such as the front, the rear, sides, interior 22, exterior 20, or any other location within the vehicle 16 or around the vehicle 16.

Figure 5:
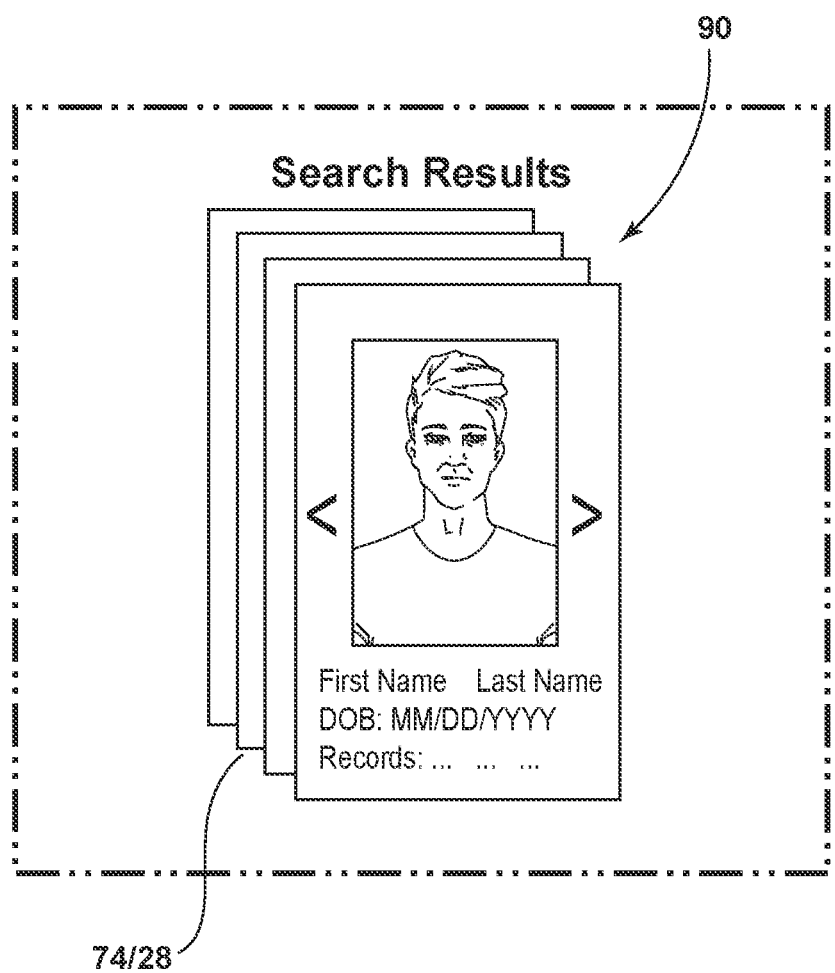
FIG. 5 is a front view of an exemplary interface displaying search results detected by a comparator unit of a monitoring system of the present disclosure.

It is also contemplated that the audio processing performed by the monitoring system 10 may be used to capture supposed identification information provided to compare and utilize in tandem with the biometric information captured by the biometric sensors at the comparator 87. For example, audio processing may detect a name of the individual 12 as purported by the individual 12, and the biometric features may be used in tandem with the name to limit the search results 90 and/or prioritize search results 90. For example, as illustrated in FIG. 5, a frontmost, or most prioritized result may be displayed first based on matching of the biometric information and identification information (e.g., names, dates of birth, addresses, or other information). In this way, visual and audible transmission units may be installed in the vehicle 16 and used for capturing biometric and/or identification information of the individual 12 to detect security events.

In general, the present monitoring system 10 may provide for enhanced detection of security events within a vehicle environment 14 and allow for verification of identity of individuals 12 participating in the monitoring environment.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A monitoring system for a vehicle environment, comprising:
   a biometric sensor that captures biometric information of a participant;
   a database that stores biometric data of a security event cohort; and
   control circuitry in communication with the biometric sensor, wherein the control circuitry is configured to:
      compare the biometric information to the biometric data to detect one or more matches;
      select between a first privacy mode and a second privacy mode based on a magnitude of a previously occurring security event associated with one or more individuals identified by a result of the comparison; and
      communicate an indication of the result of the comparison of the biometric information to the biometric data in the selected privacy mode to a user of the monitoring system, wherein when the result is communicated in the first privacy mode, the result is communicated in a code undecipherable by the participant from whom the biometric information has been captured, yet decipherable by the user of the monitoring system thereby informing the user of the result without informing the participant of the result.

2. The monitoring system of claim 1, wherein the database is located in a server remote from the vehicle environment and the biometric information is communicated wirelessly from the vehicle environment to the server.

3. The monitoring system of claim 1, wherein the security event cohort includes an identity of an individual assigned with at least one of an active warrant and a missing person report.

4. The monitoring system of claim 1, wherein the control circuitry is configured to select the first privacy mode when the result includes the one or more matches and the second privacy mode when the result does not include a match.

5. The monitoring system of claim 4, wherein the communication in the first privacy mode includes presenting the indication of the result at a mobile device of an administrator of the monitoring system, and wherein the communication in the second privacy mode includes presenting the indication of the result at a vehicle display in a vehicle interior.

6. The monitoring system of claim 1, wherein the biometric sensor includes a scan area directed to a region external to the vehicle.

7. The monitoring system of claim 1, wherein the biometric sensor includes a camera and an image processor configured to extract facial features from an image captured by the camera.

8. The monitoring system of claim 1, further comprising:
   a door handle and a touch sensor coupled to the door handle that is in communication with the control circuitry,
   wherein the control circuitry is configured to activate the biometric capturing in response to a detection by the touch sensor that the user has held the door handle and engaged the touch sensor for a predetermined period of time.

9. The monitoring system of claim 1, wherein the control circuitry is configured to communicate a signal to indicate capture of the biometric information.

10. The monitoring system of claim 1, further comprising:
   a coaching unit configured to interact with the biometric sensor and output devices of the monitoring system to communicate, via the output devices, instructions to the user to align the participant within an accessible range of the biometric sensor to facilitate the capture of the biometric information by the biometric sensor from the participant.

11. The monitoring system for a vehicle environment of claim 1, wherein the code is in the form of a color code.

12. A monitoring system for a vehicle environment, comprising:
   a biometric sensor that captures biometric information of a participant;
   a database located in a server remote from the vehicle environment and storing biometric data of a security event cohort; and
   control circuitry in communication with the biometric sensor and configured to:
      compare, remote from the vehicle environment, the biometric information to the biometric data to detect one or more matches;
      select between a first privacy mode and a second privacy mode based on a magnitude of a previously occurring security event associated with one or more individuals identified by a result of the comparison;
      communicate an indication of the result of the comparison of the biometric information to the biometric data in the selected privacy mode to a user of the monitoring system, wherein when the result is provided in the first privacy mode, the user of the monitoring system is informed of the result without informing the participant of the result, and wherein the control circuitry comprises:
         a coaching unit configured to interact with the biometric sensors and output devices of the monitoring system to communicate, via the output devices, instructions to the user to align the participant within an accessible range of the biometric sensor to facilitate the capture of the biometric information by the biometric sensor from the participant.

13. The monitoring system of claim 12, wherein when the result is presented in the first privacy mode, the result is presented in a code undecipherable by the participant from whom the biometric information has been captured, yet decipherable by the user thereby informing the user of the result without informing the participant of the result.

14. The monitoring system of claim 12, wherein the security event cohort includes an identity of an individual assigned with a missing person report.

15. The monitoring system of claim 12, wherein the communication in the first privacy mode includes presenting the indication of the result at a mobile device of an administrator of the monitoring system, and wherein the communication in the second privacy mode includes presenting the indication of the result at a vehicle display.

16. The monitoring system of claim 12, wherein the biometric sensor includes a camera and an image processor configured to extract facial features from an image captured by the camera.

17. The monitoring system of claim 12, further comprising:
   a door handle and a sensor coupled to the door handle configured to detect manual engagement of the door handle; and wherein the control circuitry is configured to activate the biometric capturing in response to manual engagement of the door handle.

18. The monitoring system of claim 12, wherein the control circuitry is configured to communicate a signal to indicate capture of the biometric information.

19. The monitoring system for a vehicle environment of claim 12, wherein the instructions communicated by the coaching unit are coded so as to not disclose to the participant the instructions communicated to the user of the monitoring system by the coaching unit.

20. A monitoring system for a vehicle environment, comprising:

a biometric sensor that captures biometric information of a participant;

a database located in a server remote from the vehicle environment and storing biometric data of a security event cohort, the security event cohort including an identity of a person assigned with at least one of an active warrant and a missing person report;

control circuitry in communication with the biometric sensor and configured to:

compare the biometric information to the biometric data to detect one or more matches;

select between a first privacy mode and a second privacy mode based on a magnitude of a previously occurring security event associated with one or more individuals identified by a result of the comparison; and communicate an indication of the result of the comparison of the biometric information to the biometric data in the selected privacy mode to a user of the monitoring system, wherein when the result is communicated in the first privacy mode the indication of the result is presented at a mobile device of an administrator of the monitoring system such that the user of the monitoring system may be informed of the result without informing the participant of the result, and when the result is communicated in the second privacy mode, the indication of the result is presented at a vehicle display in a vehicle interior such that the user of the monitoring system is informed of the result and the participant may be informed of the result;

a door handle that facilitates access to the vehicle; and a touch sensor coupled to the door handle, in communication with the control circuitry and operable to activate the biometric sensor in response to a detection by the touch sensor that a user of the monitoring system has held the door handle and engaged the touch sensor for a predetermined period of time.

\* \* \* \* \*